United States Patent Office 3,594,425
Patented July 20, 1971

3,594,425
HYDROFORMYLATION PROCESS
Walter H. Brader, Jr., Stanley B. Cavitt, and Robert M. Gipson, Austin, Tex., assignors to Jefferson Chemical Company, Inc., Houston, Tex.
No Drawing. Filed July 7, 1966, Ser. No. 563,374
Int. Cl. C07c 45/08
U.S. Cl. 260—604     10 Claims

ABSTRACT OF THE DISCLOSURE

Olefins are reacted with carbon monoxide and hydrogen to yield an aldehyde or alcohol having one more carbon atom than the olefin under hydroformylation reaction conditions in the presence of a complex catalyst comprising as essential ingredients a transition metal and a polyamine containing at least two amino-functional groups where the amino-functional groups are separated by one to four carbon atoms.

---

This invention is concerned with the hydroformylation of olefins. More particularly, this invention is concerned with the hydroformylation of olefins in the presence of a complex catalyst comprising a transition metal and a polyamine.

The reaction of an olefin with carbon monoxide and hydrogen to yield an aldehyde or alcohol having one more carbon atom than the olefin is a well-known reaction. The reaction may be conducted at a temperature of from 75 to about 250° C., and a pressure of from 100 to 10,000 p.s.i.g. A metallic catalyst is employed in the reaction.

A most commonly used catalyst of the prior art is dicobalt octacarbonyl. In recent years, other metals such as iron, palladium and rhodium have been employed and various complexing agents have been added to the system in an effort to find more effective catalysts. Complexing agents that have been employed include, for example, phosphines, electronegative pyridines and difunctional oxygen compounds. None of the prior art catalysts have proved to be entirely satisfactory. They have either proved to be poor catalysts or have been difficult to remove from the product and could not be recovered in a catalytically active form.

We have now discovered that the shortcomings of the prior art catalysts may be overcome by the use of a transition metal complex, the exact nature of which is not known. There are two major components of the catalyst that must be added to the reaction system. The first of these is a transition metal. Transition metals that can be employed include, for example, cobalt, iron, rhodium, nickel, palladium, titanium, vanadium, chromium, manganese, molybdenum, ruthenium, platinum, and iridium. Preferred transition metals are those from Group VIII of the Periodic Table. Particularly preferred metals are cobalt, rhodium and iron. In preparing the complex catalyst the transition metal may be employed in the form of virtually any compound of the metal. For example, the metal may be used in the form of an organic or inorganic salt such as for example the acetate, the chloride, the bromide, the iodide, the acetylacetonate and the metal carbonyl.

A second major component of the complex is a polyamine containing at least two amino functional groups. In particular, the polyamine may be a di- or higher alkyl, aryl or heterocyclic polyamine and the amine functions may be primary, secondary, tertiary or contained in an aromatic nucleus or combinations of these. In the case of alkyl polyamines, the amine functions preferably are separated by one to four carbon atoms and more preferably, by two to three carbon atoms. In the case of heterocyclic amines, the amine functions preferably are separated by not more than two carbon atoms and in the case of alicyclic or aromatic amines, the amine functions preferably are on adjacent carbon atoms of the ring. Examples of amines that can be used include ethylenediamine, propanediamine, 1,2 - dianilinoethane, 1,2-dimorpholinoethane, piperazine, o-phenylenediamine, diethylenetriamine, 2,2' - dipyridyl, triethylenediamine, methyltriethylenediamine, ethyltriethylenediamine, dimethyltriethylenediamine and alkylene oxide adducts of polyamines, such as the four mol propylene oxide adduct of ethylenediamine and the two mol ethylene oxide adduct of diethylenetriamine. The number of mols of polyamine employed per gram atom of transition metal should be within the range of from 0.5:1 to 15:1.

As stated hereinabove, the exact composition of the complex catalyst is not known. It appears that the catalytically active complex may contain, in addition to the transition metal and the polyamine, one or more substituents selected from the group consisting of carbon monoxide, hydrogen, olefin and the anion of the metal salt used. The catalyst is more active after having been used in the hydroformylation reaction, thus indicating the possibility of the presence of one or more molecules of carbon monoxide, hydrogen and olefin in the complex.

The complex catalyst may be prepared in situ by the addition of the transition metal compound and the polyamine to the hydroformylation reactor, followed by the introduction of carbon monoxide, hydrogen and olefin in the normal hydroformylation procedure. If desired, an intermediate complex may be prepared by treatment of a mixture of the transition metal compound and the polyamine with carbon monoxide and hydrogen. This intermediate is then added to the hydroformylation reactor.

Because the composition of the catalytically active complex is unknown, it will be referred to for purposes of this application as a complex comprising a transition metal and a polyamine. This description is used since it is known that both the metal and the polyamine are essential components of the complex, while the identity of other components is not known. It is to be understood that this description is intended to include any other components as described hereinabove that are also a part of the active catalyst complex.

In conducting a hydroformylation reaction with our catalyst it is preferred that an inert solvent be used. Such a solvent might be a hydrocarbon, an ether or a lower aliphatic alcohol. Examples of suitable solvents include benzene, toluene, ethanol, isopropanol, ethylene glycol monomethyl ether and ethylene glycol dimethyl ether. It may also be advantageous to use a mixed solvent system such as, for example, a mixture of benzene and ethanol.

One of the main advantages of our catalyst over prior art catalysts is that our catalyst may be recovered from the hydroformylation reaction products in a readily reuseable form by a simple distillation to remove unreacted olefin and the aldehyde and alcohol products. The residue from this distillation contains the catalyst, which may be reused simply by adding this residue to a hydroformylation reactor. It is not necessary to go through a complicated procedure for the recovery of the metal, followed by conversion of the metal to the active complex.

Our invention will be further illustrated by the following examples which are intended to be illustrative only and are not intended to place any limitations upon the invention.

EXAMPLE I

A 300 ml. autoclave was charged with 120 grams of octene-1, 15 ml. of a toluene solution of dicobalt octacarbonyl containing 0.22 grams of cobalt and 3.8 grams of 1,2-di(4-morpholino)ethane. This mixture was reacted with a 1:1 mixture of hydrogen and carbon monoxide at 185–190° C. and 300–1,000 p.s.i.g. for 4½ hours. The reaction mixture was distilled at 4 mm. pressure to yield 42 grams of $C_9$ aldehydes, 26 grams of $C_9$ alcohols and 19 grams of residue containing the dissolved complex catalyst.

EXAMPLE II

The residue from the distillation cited in Example I, 118 grams of octene-1 and 50 grams of toluene were placed in a 1400 ml. autoclave and reacted with a 1:1 mixture of hydrogen and carbon monoxide at 165–193° C. and 2,125–3,000 p.s.i.g. for 3 hours. Distillation of the reaction mixture gave 18 grams of $C_9$ aldehydes, 72 grams of $C_9$ alcohols and 58 grams of residue containing the dissolved complex catalyst.

EXAMPLE III

A 300 ml. autoclave was charged with 10 grams of cobalt acetylacetonate, 9.5 grams of N,N,N',N'-tetramethylethylenediamine and 100 ml. of toluene. This mixture was treated with a 1:1 mixture of hydrogen and carbon monoxide at 200° C. and 2,000–2,800 p.s.i.g. for 4 hours. The reaction mixture was stripped of solvent and excess amine at reduced pressure to yield 17 grams of a mobile orange liquid.

A 1400 ml. autoclave was charged with 2.95 grams of the prepared cobalt complex, 251 grams of octene-1 and 23 ml. of methanol. This mixture was treated with a 1:1 mixture of hydrogen and carbon monoxide for 2 hours at 184–189° C. and 500–1,000 p.s.i.g. Distillation of the reaction mixture gave 123 grams of $C_9$ aldehydes, 37 grams of $C_9$ alcohols and 47 grams of residue containing the dissolved catalyst.

EXAMPLE IV

A 1400 ml. autoclave was charged with 200 grams of octene-1, 10 ml. of a toluene solution of dicobalt octacarbonyl (0.165 grams of cobalt) and 3 ml. of N,N,N',N'-tetramethylpropanediamine. This mixture was treated with a 2:1 mixture of hydrogen and carbon monoxide at 189–193° C. for 2½ hours at a pressure of 500–1,000 p.s.i.g. Distillation of the reaction mixture gave 89 grams of $C_9$ aldehydes, 23 grams of $C_9$ alcohols and 17 grams of residue.

EXAMPLE V

A 300 ml. autoclave was charged with 122 grams of octene-1, 15 ml. of a toluene solution of dicobalt octacarbonyl (0.22 grams of cobalt) and 4 ml. of N,N,N',N'-tetrabutylethylenediamine. This was treated with a 1:1 mixture of hydrogen and carbon monoxide at 160–199° C. and 275–1,000 p.s.i.g. for 3½ hours. Analysis of the reactor effluent by vapor phase chromatography showed the presence of 44.5% $C_9$ aldehydes and 11.1% $C_9$ alcohols.

EXAMPLE VI 300 ml. autoclave was charged with 120 grams of octene-1, a toluene solution of dicobalt octacarbonyl containing 0.27 grams of cobalt and 4 grams of piperazine. This was treated with a mixture of 1:1 hydrogen and carbon monoxide at 180–195° C. and 400–1,000 p.s.i.g. for 5½ hours. Distillation of the product gave 38.1 grams of $C_9$ aldehydes, 1.9 grams of $C_9$ alcohols and 24 grams of residue containing the dissolved complex catalyst.

EXAMPLE VII

A 300 ml. autoclave was charged with 118 grams of octene-1, a toluene solution of dicobalt octacarbonyl containing 0.22 grams of cobalt and 0.6 grams of o-phenylenediamine. This mixture was treated with a 1:1 mixture of hydrogen and carbon monoxide at 155–190° C. and 500–1,000 p.s.i.g. for 3 hours. Distillation of the product gave 68.3 grams of $C_9$ aldehydes and 21.5 grams of $C_9$ alcohols.

EXAMPLE VIII

A 300 ml. autoclave was charged with 103 grams of octene-1, a toluene solution of dicobalt octacarbonyl containing 0.22 grams of cobalt, and 1.5 grams of triethylenediamine. This mixture was treated with a 1:1 mixture of hydrogen and carbon monoxide at 185–193° C. and 500–1,000 p.s.i.g. for 5⅔ hours. Distillation of the product gave 49.8 grams of $C_9$ aldehydes, 10.9 grams of $C_9$ alcohols and 12 grams of residue containing the catalyst complex.

EXAMPLE IX

A 300 ml. autoclave was charged with 100 grams of octene-1, 50 ml. of toluene, 3 grams of iron pentacarbonyl, and 3 ml. of N,N,N',N'-tetramethylethylenediamine. This was treated with a 1:1 mixture of hydrogen and carbon monoxide at 165–195° C. at 1,200–3,000 p.s.i.g. for 7½ hours. Distillation of the product gave 37.5 grams of $C_9$ aldehydes, 14.5 grams of $C_9$ alcohols and 44 grams of residue containing the catalyst complex.

EXAMPLE X

A 1,400 ml. autoclave was charged with 120 grams of octene-1, 120 grams of toluene, a toluene solution of dicobalt octacarbonyl containing 0.22 gram of cobalt and 0.5 ml. of ethylenediamine. This was treated with a 1:1 mixture of hydrogen and carbon monoxide at 180–195° C. and 1,750–3,000 p.s.i.g. for 3 hours. Distillation of the products gave 54.8 grams of $C_9$ aldehydes, 41.3 grams of $C_9$ alcohols and 41 grams of residue containing the catalyst complex.

EXAMPLE XI

A 300 ml. autoclave was charged with 70 grams of octene-1, 50 grams of toluene, 1 gram of palladium chloride and 1 gram of triethylenediamine. This mixture was treated with a 1:1 mixture of hydrogen and carbon monoxide at 200–211° C. and 2,075–3,000 p.s.i.g. for 6¼ hours. The reaction mixture contained a green crystalline precipitate which was removed by filtration. Distillation of the filtrate gave 41.2 grams of $C_9$ aldehydes, 7.7 grams of $C_9$ alcohols and 13 grams of residue.

EXAMPLE XII

A 300 ml. autoclave was charged with 100 grams of octene-1, 50 grams of toluene, 15 ml. of a toluene solution of dicobalt octacarbonyl containing 0.22 grams of cobalt and 1 gram of dianilinoethane. Treatment of this solution with a 1:1 mixture of hydrogen and carbon monoxide at 157–196° C. and 50–1,000 p.s.i.g. for 1½ hours followed by distillation of the product, gave 37 grams of $C_9$ aldehydes and alcohols and 17 grams of residue.

EXAMPLE XIII

A 1,400 ml. autoclave was charged with 115 grams of octene-1, 100 grams of toluene, 0.7 grams of 2,2'-dipyridyl and 15 ml. of a toluene solution of dicobalt octacarbonyl containing 0.22 grams of cobalt. This mixture was treated with a 1:1 mixture of hydrogen and carbon monoxide at 190–195° C. and 2,300–3,000 p.s.i.g. for 70 minutes. Distillation of the product gave 55 grams of $C_9$ aldehyde, 33 grams of $C_9$ alcohols and 39 grams of residue.

EXAMPLE XIV

A 1,400 ml. of autoclave was charged with 120 grams of octene-1, 100 grams of toluene, 0.8 ml. of diethylenetriamine and 15 ml. of a toluene solution of dicobalt octacarbonyl containing 0.22 grams of cobalt. This mixture was treated with a 1:1 mixture of hydrogen and carbon monoxide at 188–190° C. and 1,125–3,000 p.s.i.g. for 1 hour. Distillation of the product gave 61 grams of $C_9$ aldehydes, less than 3 grams of $C_9$ alcohols and 39 grams of residue.

EXAMPLE XV

A 300 ml. autoclave was charged with 100 grams of octene-1, 40 grams of toluene, 2 grams of manganese acetylacetonate and 2 ml. of ethylenediamine. This mixture was treated with a 1:1 mixture of hydrogen and carbon monoxide at 200–207° C. and 2,050–3,000 p.s.i.g. for 14 hours. Distillation of the product gave approximately 24 grams of $C_9$ aldehydes, less than 2 grams of $C_9$ alcohols and 42 grams of residue.

EXAMPLE XVI

To a one-liter stirred autoclave were added 336 grams (3.0 mols) of octene-1 and a catalyst solution consisting of 0.26 grams of rhodium trichloride trihydrate, 0.67 grams of triethylenediamine, 40 grams of ethanol and 40 grams of benzene. The reactor was flushed with a 1:1 mixture of hydrogen and carbon monoxide, pressured to 1,000 pounds with this mixture and heated to reaction temperature. The reaction required approximately 4 hours at 126–162° C. and 500–3,000 p.s.i.g. The crude reactor effluent was rinsed from the reactor with 50 ml. of methanol and was found to weight 533 grams. This material was distilled in vacuo using a nitrogen bleed to give 334 grams of a mixture of $C_9$ aldehydes and alcohols having a boiling point of 70–105° C. at 15 mm. pressure. There were also obtained 131 grams of light materials, primarily solvent and wash liquids, and 83 grams of residues. Analysis of the various mixtures gave the results listed below:

Olefin conversion (based on 100% olefin charged): 100% overall, 97% to oxo product, 3% to paraffin.

$C_9$ oxo product yield, based on starting olefin: 79%.

Residues based on distilled $C_9$ oxo products: 25%.

EXAMPLE XVII

To a one-liter stirred autoclave were added 336 grams (3 mols) of octene-1, then 83 grams of residues from Example XVI and 17 grams of benzene. This mixture was heated for approximately 4 hours at 120–162° C. and 1,000–3,000 p.s.i.g. of a 1:1 mixture of hydrogen and carbon monoxide. The product mixture was worked up by the procedure described in Example XVI to give 401 grams of a mixture of $C_9$ aldehydes and alcohols having a boiling point of 70–97° C. at 15 mm. pressure, 76 grams of light materials and 93 grams of residues. This represents an increase of 10 grams of residues over that obtained in Example XVI. Analysis of the product mixtures gave the results outlined below:

Olefin conversion (basis 100% olefin charged): 100% overall, 97% to oxo product, 3% to paraffin.

$C_9$ oxo product yield, based on starting olefin: 94%.

Residues based on distilled $C_9$ oxo product: 3%.

In both Examples XVI and XVII, it was observed that the catalyst residue contained very finely divided solids suspended in the solution. It was also observed that the major products in Example XVI were alcohols, being present in a 5:1 ratio over aldehydes, whereas in Example XVII the aldehyde to alcohol ratio was 2:1. Both reactions were performed under comparable conditions. It will also be noted that although Examples XVI and XVII were run under the same conditions, the yields obtained in Example XVII were considerably better than those obtained in Example XVI. This would indicate that the catalyst is more selective for the formation of oxo products after having been once used in an oxo reaction.

EXAMPLE XVIII

To a one-liter stirred autoclave were added 336 grams of octene-1 and a catalyst solution consisting of 0.26 gram of rhodium trichloride trihydrate (300 p.p.m. rhodium based on charged olefin), 1.26 grams of methyltriethylenediamine, 40 grams of benzene and 40 grams of ethanol. The reactor was flushed with a 1:1 mixture of hydrogen and carbon monoxide, pressured to 1,000 p.s.i.g. with this gas mixture, heated to reaction temperature and repressured to 3,000 p.s.i.g. as necessary. The reaction was complete in about 1 hour over a temperature range of 105–130° C. and a pressure range of 800–3,000 p.s.i.g. The product mixture was rinsed from the reactor with 50 ml. of methanol and distilled in vacuo to give 394 grams of $C_9$ oxo products, B.P. 70–89° C. at 15 mm., 130 grams of lights and 9 grams of residue to a maximum pot temperature of 150° C. Olefin conversion was 99%, 97% to oxo products and 2% to paraffin, the yield of $C_9$ oxo products based on theoretical aldehydes was 93%; and the residues yield based on theoretical aldehydes was 2%.

EXAMPLE XIX

Example XVIII was repeated except that 0.84 gram of hexamethylenetetramine was substituted for the methyltriethylenediamine. The reaction required about 4⅓ hours at 125–166° C. and 600–3,000 p.s.i.g. Distillation gave 330 grams of $C_9$ oxo products, 88 grams of lights and 76 grams of residue. Olefin conversion was 100%, 97% to oxo products and 3% to paraffins. Yield of $C_9$ oxo products was 78% and yield of residues was 18%.

EXAMPLE XX

A 300 ml. autoclave was charged with the residue from Example IX and 118 grams of octene-1. This mixture was treated for 3 hours with a 1:1 mixture of hydrogen and carbon monoxide at 153–200° C. and 350–3,000 p.s.i.g. Distillation of the reactor effluent gave 74 grams of $C_9$ aldehydes and alcohols and 87 grams of residue.

EXAMPLE XXI

A 300 ml. autoclave was charged with the residue from Example X and 100 grams of octene-1. This mixture was treated for 5 hours with a 1:1 mixture of hydrogen and carbon monoxide at 168–191° C. and 550–3,000 p.s.i.g. Distillation of the crude product gave 37 grams of $C_9$ aldehydes, 38 grams of $C_9$ alcohols and 69 grams of residue.

EXAMPLE XXII

A 300 ml. autoclave was charged with 100 grams of octene-1, 50 grams of toluene, 2 grams of chromium acetylacetonate and 2 ml. of N,N,N',N'-tetramethylethylenediamine. This mixture was treated for 6¼ hours with a 1:1 mixture of hydrogen and carbon monoxide at 150–200° C. and 2,000–3,000 p.s.i.g. Distillation gave 23 grams of $C_9$ aldehydes and 16 grams of residue.

EXAMPLE XXIII

The purpose of this example is to demonstrate that a monoamine is not suitable for use in the preparation of our catalyst. A 300 ml. autoclave was charged with 112 grams of octene-1, 6½ grams of dicobalt octacarbonyl dissolved in toluene and 1½ grams of tripropylamine. This mixture was treated with a 2:1 mixture of hydrogen and carbon monoxide at 200° C. and 700 p.s.i.g. for five hours. Analysis of the effluent showed the presence of approximately 50% $C_9$ aldehydes and alcohols. However, unlike all of the other examples the catalyst had decomposed to metallic cobalt and thus was not suitable for reuse without prior treatment.

Having thus described our invention, we claim:

1. In a method for the hydroformylation of an olefin by adding carbon monoxide and hydrogen to the olefin reacting said mixture in the presence of a hydroformylation catalyst and recovering the aldehyde and alcohol product the improvement which comprises conducting the reaction in the presence of a complex catalyst consisting essentially of a transition metal and a polyamine, the molar ratio of polyamine to transition metal being within the range of from 0.5:1 to 15:1; wherein the polyamine is selected from the group consisting of ethylenediamine, propanediamine, 1,2 - dianilinoethane, 1,2 - dimorpholinoethane, piperazine, o - phenylenediamine, diethylenetriamine, 2,2'-dipyridyl, triethylenediamine, methyltriethylenediamine, ethyltriethylenediamine, dimethyltriethylenediamine, N,N,N',N'-tetramethylethylenediamine, N,N,N', N'-tetramethylpropanediamine, N,N,N',N' - tetrabutylethylenediamine, hexamethylenetetramine.

2. A method as in claim 1 wherein the transition metal is a Group VIII transition metal.

3. A method as in claim 1 wherein the transition metal is rhodium.

4. A method as in claim 1 wherein the transition metal is cobalt.

5. A method as in claim 1 wherein the transition metal is iron.

6. In a method for the hydroformylation of an olefin by adding carbon monoxide and hydrogen to the olefin, reacting said mixture in the presence of a hydroformylation catalyst and recovering the aldehyde and alcohol product the improvement which comprises conducting the reaction in the presence of a complex catalyst consisting essentially of a transition metal and a polyamine, the molar ratio of polyamine to transition metal being within the range of from 0.5:1 to 15:1, wherein the polyamine is selected from the group consisting of:

(a) a polyamine selected from group A consisting of ethylene diamine, propanediamine and diethylenetriamine;

(b) a heterocyclic polyamine selected from group B consisting of:
 (i) piperazine
 (ii) triethylenediamine
 (iii) methyltriethylenediamine
 (iv) ethyltriethylenediamine
 (v) hexamethylenetetramine, and
 (vi) 1,2-di(4-morpholine)ethane;
and (c) a tetra-alkyl substituted alkylenediamine selected from group C consisting of N,N,N',N'-tetramethylethylenediamine, N,N,N',N' - tetramethylpropanediamine and N,N,N',N'-tetrabutylethylenediamine.

7. A method as in claim 6 wherein the polyamine is a polyamine selected from Group A.

8. A method as in claim 6 wherein the polyamine is a heterocyclic polyamine selected from Group B.

9. A method as in claim 8 wherein a reaction residue containing the complex catalyst is recovered and recycled to the hydroformylation reactor.

10. A method as in claim 6 wherein the polyamine is selected from Group C.

References Cited

UNITED STATES PATENTS

| | | | |
|---|---|---|---|
| 3,278,412 | 10/1966 | Greene | 240—604OXO |
| 2,576,112 | 11/1951 | Hagenmeyer | 240—604OXO |

FOREIGN PATENTS

| | | | |
|---|---|---|---|
| 1,326,236 | 3/1963 | France | 260—604 |

BERNARD HELFIN, Primary Examiner

R. H. LILES, Assistant Examiner

U.S. Cl. X.R.

260—632

Notice of Adverse Decision in Interference

In Interference No. 98,461, involving Patent No. 3,594,425, W. H. Brader, Jr., S. B. Cavitt and R. M. Gipson, HYDROFORMYLATION PROCESS, final judgment adverse to the patentees was rendered Dec. 9, 1976, as to claims 1, 2, 3, 6 and 8.

[*Official Gazette July 5, 1977.*]